(12) United States Patent
Kanda et al.

(10) Patent No.: US 8,766,946 B2
(45) Date of Patent: Jul. 1, 2014

(54) SENSING CIRCUIT, DISPLAY DEVICE AND ELECTRONIC APPARATUS

(75) Inventors: Eiji Kanda, Suwa (JP); Yasushi Tsuchiya, Fujimi-machi (JP); Tokuro Ozawa, Suwa (JP); Toshiharu Matsushima, Tottori (JP)

(73) Assignee: Seiko Epson Corporation, Tokyo (JP)

( * ) Notice: Subject to any disclaimer, the term of this patent is extended or adjusted under 35 U.S.C. 154(b) by 978 days.

(21) Appl. No.: 12/427,433

(22) Filed: Apr. 21, 2009

(65) Prior Publication Data

US 2009/0273578 A1 Nov. 5, 2009

(30) Foreign Application Priority Data

May 2, 2008 (JP) ................................. 2008-120097
Sep. 4, 2008 (JP) ................................. 2008-227432

(51) Int. Cl.
*G06F 3/045* (2006.01)

(52) U.S. Cl.
USPC ........................................ 345/174; 345/173

(58) Field of Classification Search
USPC ................................ 345/156–184
See application file for complete search history.

(56) References Cited

U.S. PATENT DOCUMENTS

| | | | | |
|---|---|---|---|---|
| 4,161,766 A | * | 7/1979 | Castleberry et al. | 361/280 |
| 6,204,897 B1 | * | 3/2001 | Colgan et al. | 349/12 |
| 7,280,167 B2 | * | 10/2007 | Choi et al. | 349/12 |
| 7,379,054 B2 | * | 5/2008 | Lee | 345/173 |
| 7,477,445 B2 | * | 1/2009 | Lee | 359/296 |
| 7,499,114 B2 | * | 3/2009 | Choi et al. | 349/12 |
| 7,573,459 B2 | * | 8/2009 | Shih et al. | 345/104 |
| 7,583,092 B2 | * | 9/2009 | Reynolds et al. | 324/688 |
| 7,742,041 B2 | * | 6/2010 | Lee et al. | 345/173 |
| 8,063,886 B2 | * | 11/2011 | Serban et al. | 345/173 |
| 8,089,288 B1 | * | 1/2012 | Maharita | 324/678 |
| 8,089,470 B1 | * | 1/2012 | Schediwy et al. | 345/173 |
| 2003/0156087 A1 | * | 8/2003 | Boer et al. | 345/92 |
| 2004/0150629 A1 | * | 8/2004 | Lee | 345/173 |
| 2006/0017710 A1 | * | 1/2006 | Lee et al. | 345/173 |
| 2007/0222762 A1 | * | 9/2007 | Van Delden et al. | 345/173 |
| 2008/0018608 A1 | * | 1/2008 | Serban et al. | 345/173 |
| 2008/0018611 A1 | * | 1/2008 | Serban et al. | 345/173 |
| 2008/0062148 A1 | * | 3/2008 | Hotelling et al. | 345/174 |
| 2008/0067528 A1 | * | 3/2008 | Choi et al. | 257/89 |
| 2008/0069413 A1 | * | 3/2008 | Riedijk et al. | 382/124 |
| 2008/0078590 A1 | * | 4/2008 | Sequine | 178/18.06 |
| 2008/0212258 A1 | * | 9/2008 | Fukui et al. | 361/305 |
| 2008/0259044 A1 | * | 10/2008 | Utsunomiya et al. | 345/173 |
| 2009/0284492 A1 | * | 11/2009 | Chino | 345/174 |

FOREIGN PATENT DOCUMENTS

| | | |
|---|---|---|
| JP | 2007-041602 A | 2/2007 |
| JP | 2007-048275 A | 2/2007 |
| JP | 2007-510949 A | 4/2007 |
| JP | 2007-122733 A | 5/2007 |
| WO | WO 2005/043229 A1 | 5/2005 |

\* cited by examiner

*Primary Examiner* — Amare Mengistu
*Assistant Examiner* — Sarvesh J Nadkarni
(74) *Attorney, Agent, or Firm* — Oliff PLC

(57) ABSTRACT

A sensing circuit having a first substrate, a second substrate, a layer of dielectric material, a first electrode, a second electrode and an electrostatic capacitance detection unit is provided. The second substrate faces the first substrate. The dielectric material is held between the first substrate and the second substrate. The first electrode and the second electrode are arranged between the dielectric material and the first substrate. The electrostatic capacitance detection unit is configured to produce a detection signal having an amplitude according to a value of capacitance formed between the first electrode and the second electrode through the dielectric material.

20 Claims, 11 Drawing Sheets

SENSING CIRCUIT, DISPLAY DEVICE AND ELECTRONIC APPARATUS

CROSS-REFERENCE TO RELATED APPLICATIONS

This application claims priority to JP 2008-120097 filed in Japan on May 2, 2008 and to JP 2008-227432 filed in Japan on Sep. 4, 2008, the disclosures of which are hereby incorporated by reference in their entireties.

BACKGROUND

1. Technical Field

The present invention relates to a sensing circuit, a display device and an electronic apparatus.

2. Related Art

A sensing circuit configured to detect contact with an object such as a finger or a pen is known, e.g., as disclosed in JP-A1-2007-510949. The sensing circuit of JP-A1-2007-510949 is configured to detect a change in the capacitance of a capacitor element formed by electrodes arranged on two substrates facing each other and a dielectric material such as liquid crystal filled between the electrodes, so as to detect contact with an object. Sensitivity of sensing is given as a ratio of the capacitance of the capacitor element in an ordinary state to the capacitance of the capacitor element while the object is in contact with the substrate.

Incidentally, the capacitance of a capacitor element is determined from the areas of the electrodes, the permittivity of the dielectric material, and the distance between the electrodes. An ordinary sensing circuit has a spacer arranged in edge portions of two substrates facing each other for specifying a distance between the substrates. In general, the substrates warp due to their own weights even if no object is in contact with the substrate. Thus, it is not easy for the ordinary sensing circuit to keep the distance between the electrodes constant in every portion of the substrate, and it is difficult to set the capacitance to a target value. Accordingly, the ordinary sensing circuit has a problem in that the sensitivity of sensing varies.

SUMMARY

An advantage of some aspects of the invention is that a reduction in the variation of sensitivity of a sensing circuit can be achieved.

In order to address the above problem, an aspect of the invention is to provide a sensing circuit having a first substrate, a second substrate, a layer of dielectric material, a first electrode, a second electrode and an electrostatic capacitance detection unit. The second substrate faces the first substrate. The dielectric material (e.g., liquid crystal 57 shown in FIG. 8) is held between the first substrate and the second substrate. The first electrode and the second electrode are arranged between the dielectric material and the first substrate (i.e., the first electrode and the second electrode are arranged on a side of the first substrate facing the second substrate). The electrostatic capacitance detection unit is configured to produce a detection signal (e.g., a detection current It shown in FIG. 6) having an amplitude according to a value of capacitance formed between the first electrode and the second electrode through the dielectric material. According to the above configuration, as the first electrode and the second electrode are arranged between the dielectric material and the first substrate, a distance between the electrodes can be kept constant, differently from a configuration in which each of the first substrate and the second substrate facing each other has an electrode. Thus, the capacitance of a capacitor element can be set to a target value, and variation of sensitivity of sensing can be reduced.

The sensing circuit of the invention can be so configured that another element is arranged between the electrode and the dielectric material. If liquid crystal is adopted as the dielectric material, e.g., the sensing circuit can be so configured that an orientation membrane for specifying orientation of liquid crystal molecules is arranged between the electrode and the liquid crystal. The sensing circuit may be similarly so configured that another element is arranged between the electrode and the first substrate. If the sensing circuit is constituted by including a transistor formed by an insulation layer, a semiconductor layer, a drain electrode and a source electrode, and metallic wiring, e.g., each of the portions of the transistor or the metallic wiring can be arranged between the electrode and the first substrate.

The sensing circuit of the invention can be preferably so configured that the first electrode and the second electrode are formed on the same layer, that the first electrode has at least two projections extending in one direction, and that the second electrode has a projection extending toward a portion between the two projections of the first electrode. The sensing circuit can be so configured, e.g., that the first electrode and the second electrode are formed on the same layer, that at least one of the first electrode and the second electrode is shaped like the teeth of a comb, and that the first electrode and the second electrode are arranged to mesh with each other. According to the above configuration, a portion where both of the electrodes are arranged close to each other can be secured. Thus, as an area that an electric field generated between the first electrode and the second electrode is applied to is greater than that of a configuration in which both of the first electrode and the second electrode are shaped rectangular, the orientation of the liquid crystal can be easily disordered so that a change of the capacitance resulting from going from a non-contact state to a contact state and vice versa increases. The above configuration has an advantage in that detection sensitivity can increase.

The sensing circuit of the invention can be preferably so configured that the first electrode and the second electrode are formed from different layers and arranged to face each other, that the first electrode is arranged between the dielectric material and the second electrode, and that a slit (e.g., a slit 68 shown in FIG. 10) is formed in the first electrode for passing an electric field generated between the first electrode and the second electrode. According to the above configuration, as the first electrode and the second electrode are formed from different layers and arranged to face each other, an electric field emitted from the second electrode to the first electrode through the slit or vice versa includes components being perpendicular to the substrate more than in the configuration in which the first electrode and the second electrode are formed from the same layer. The dielectric material such as liquid crystal leans against the substrate, thereby. Thus, the change of the capacitance resulting from going from a non-contact state to a contact state and vice versa can be secured enough in comparison with the configuration in which the first electrode and the second electrode are formed on the same layer. The above configuration has an advantage in that the detection sensitivity can increase.

The sensing circuit of the invention can be preferably so configured that the first electrode and the second electrode are formed from different layers, that the first electrode is arranged between the dielectric material and the second electrode, that at least one of the first electrode and the second electrode has at least two projections extending in one direction, and that an area of a portion of the first electrode overlapping the second electrode is smaller than an area of a portion of the first electrode other than the portion overlapping the second electrode. The sensing circuit can be so configured, e.g., that the first electrode and the second electrode are formed from different layers, that the first electrode is arranged between the dielectric material and the second electrode, that at least one of the first electrode and the second electrode is shaped like the teeth of a comb, and that an area of a portion of the first electrode overlapping the second electrode is smaller than an area of a portion of the first electrode other than the portion overlapping the second electrode. According to the above configuration, as the area of the portion of the first electrode overlapping the second electrode is smaller than the area of the portion of the first electrode other than the portion overlapping the second electrode, the area of the electrode forming a capacitor element can be reduced. As the capacitance of the capacitor element can be reduced, the above configuration has an advantage in that the detection sensitivity of the sensing circuit can increase.

A display device of the invention includes the sensing circuit described above, and further includes a third electrode (e.g., a common electrode 55 shown in FIGS. 7, 10 and 13), a fourth electrode (e.g., a pixel electrode 53 shown in FIGS. 7, 10 and 13) and a pixel circuit. The first electrode and the third electrode are formed on the same layer. The second electrode and the fourth electrode are formed on the same layer. The pixel circuit includes the dielectric material that an electric field generated between the third electrode and the fourth electrode is applied to. The dielectric material is formed by substance having dielectric anisotropy. As the sensing circuit and the pixel circuit can be manufactured simultaneously by the same manufacturing process, the above configuration has an advantage in that the display device can be easily manufactured. The dielectric material may be formed by substance having dielectric anisotropy and optical anisotropy.

The liquid crystal and an electrophoretic layer included in descriptions of following embodiments correspond to "dielectric material" included in descriptions of Claims. The "dielectric material" included in the Claims is not limited to the liquid crystal or the electrophoretic layer, and may be any dielectric material as long as its capacitance changes depending upon whether there is contact or no contact. The dielectric material formed by substance having dielectric anisotropy is liquid crystal, e.g., and may be any material as long as having dielectric anisotropy as liquid crystal. The dielectric material having dielectric anisotropy and optical anisotropy is liquid crystal, e.g., and may be any material as long as having dielectric anisotropy and optical anisotropy as liquid crystal.

An electrode shaped like "teeth of a comb" included in the specification means an electrode having at least two projections extending in one direction such as a first electrode 64 and a second electrode 65 shown in FIGS. 7 and 13. A configuration in which "at least one of the first electrode and the second electrode is shaped like teeth of a comb, and the first electrode and the second electrode are arranged to mesh with each other" means that the one of the first electrode and the second electrode has at least two projections extending in one direction and the other has a projection extending toward a portion between the two projections. This configuration includes a case where both the electrodes overlap as viewed on a plane.

An electro-optical device of the invention can be applied to various kinds of electronic apparatuses, which typically use the electro-optical device as a display device, such as a personal computer, a mobile phone and so on.

BRIEF DESCRIPTION OF THE DRAWINGS

The invention will be described with reference to the accompanying drawings, wherein like numbers reference like elements.

FIG. 15 is a perspective view specifically showing an electronic apparatus that the invention is applied to;

FIG. 16 is a perspective view specifically showing another electronic apparatus that the invention is applied to; and FIG. 17 is a perspective view specifically showing yet another electronic apparatus that the invention is applied to.

DETAILED DESCRIPTION OF EMBODIMENTS

A. First Embodiment

Figure 1:
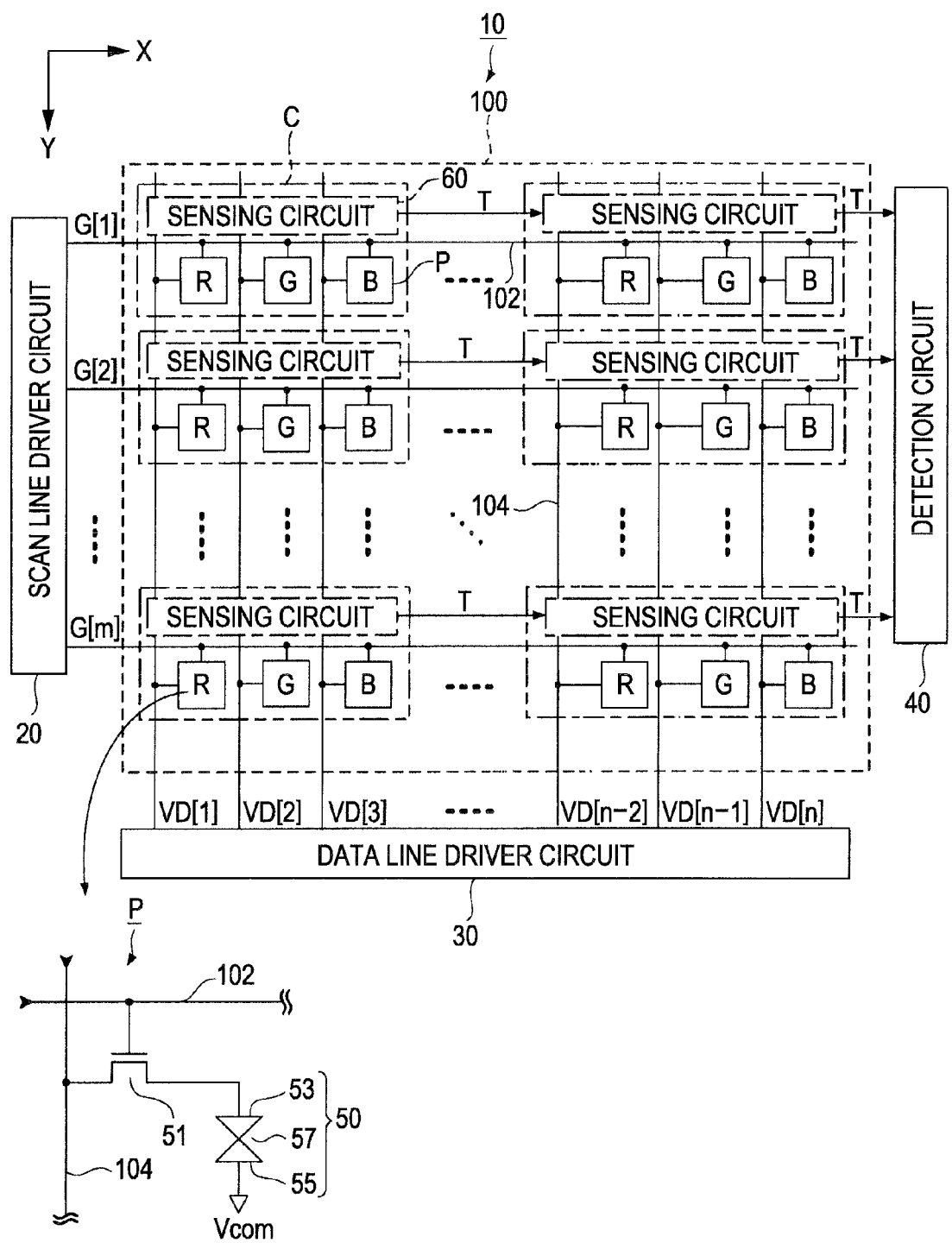
FIG. 1 is a block diagram of a display device of a first embodiment.

FIG. 1 is a block diagram of a display device 10 of a first embodiment of the invention. The display device 10 has a pixel area 100, a scan line driver circuit 20, a data line driver circuit 30 and a detection circuit 40. The pixel area 100 is formed by a plurality of pixels arranged on a plane. The scan line driver circuit 20 and the data line driver circuit 30 are configured to drive each of pixel circuits P. The detection circuit 40 is configured to detect contact between an object and the display device 10. As shown in FIG. 1, m scan lines 102 extending in an X-direction and n data lines 104 extending in a Y-direction, which is perpendicular to the X-direction, are arranged in the pixel area 100 (m and n are natural numbers no less than two). Each of the pixel circuits P is arranged at a position corresponding to an intersection of one of the scan lines 102 and one of the data lines 104. Thus, the pixel circuits P are arranged to form an m (vertical) times n (horizontal) matrix. A backlight (not shown) is arranged on a back position of the pixel area 100.

The scan line driver circuit 20 is configured to set scan signals Gi (i=1–m) each of which is provided to a corresponding one of the m scan lines 102 to an active level in order in every horizontal scan period so as to select each of the scan lines 102 in order. The data line driver circuit 30 is configured to produce data voltages VD[1]-VD[n] each of which corresponds to a corresponding one of the n pixel circuits P of one line corresponding to one of the scan lines 102 selected by the scan line driver circuit 20. The data line driver circuit 30 is configured to provide each of the data lines 104 with a corresponding one of the produced data voltages. The data voltage VD[j] (j is an integer, $1 \leq j \leq n$) provided to the data line 104 of a j-th column while an i-th row is selected is a voltage that corresponds to a gray scale specified for the pixel circuit P positioned at the j-th column of the i-th row.

As shown in FIG. 1, the pixel circuit P includes a liquid crystal element 50 and a transistor 51. The liquid crystal element 50 is constituted by a pixel electrode 53, a common electrode 55, and liquid crystal 57 that an electric field produced between the pixel electrode 53 and the common electrode 55 is applied to. The common electrode 55 is provided with a common voltage Vcom. As described later, the first embodiment adopts a horizontal electric field system in which the orientation of the molecules of the liquid crystal 57 is controlled by an electric field produced in the horizontal direction between the pixel electrode 53 and the common electrode 55. The transistor 51 is formed by an N-channel TFT (thin film transistor) and is arranged between the pixel electrode 53 and the data line 104 so as to control conduction between the pixel electrode 53 and the data line 104. The transistor 51 has a gate connected to the scan line 102. Thus, if the i-th scan line 102 is selected, the transistor 51 of each of the pixel circuits P of the i-th row is turned on, and the pixel electrode 53 of each of the pixel circuits P is provided with the data voltage VD from the data line 104. A voltage (=VD−Vcom) is applied between the pixel electrode 53 and the common electrode 55 of each of the pixel circuits P, thereby. The liquid crystal element 50 of each of the pixel circuits P has a transmittance ratio (a ratio of an amount of transmissive light reaching an observer side to an amount of light emitted from the backlight to the liquid crystal element 50) that varies depending upon the data voltage VD provided to the pixel circuit P.

Reference characters "R", "G" and "B" shown in FIG. 1 denote colors displayed by the pixel circuits P. For the first embodiment, as shown in FIG. 1, three pixel circuits P which display the respective colors "R", "G" and "B" form a group C, and a sensing circuit 60 is provided for each of the groups C. Each of the sensing circuits 60 is configured to provide a detection circuit 40 with a detection signal T for detecting contact with an object. The detection circuit 40 is configured to detect contact between the object and the display device 10 on the basis of the detection signal T provided by each of the sensing circuits 60.

Figure 2:
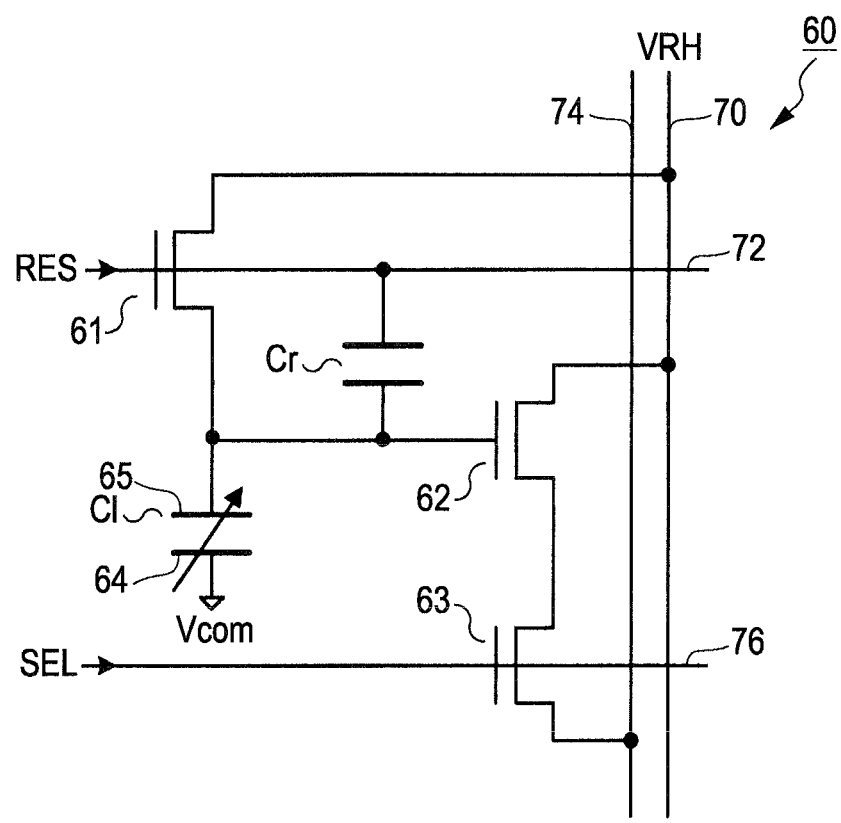
FIG. 2 is a block diagram of a sensing circuit of the first embodiment.

FIG. 2 is a circuit diagram showing a configuration of the sensing circuit 60. The sensing circuit 60 has a reset transistor 61, an amplifier transistor 62, a select transistor 63, a reference capacitor Cr and a contact detection capacitor Cl. As shown in FIG. 2, the contact detection capacitor Cl includes a first electrode 64 and a second electrode 65, and the first electrode 64 is provided with the common voltage Vcom.

As shown in FIG. 2, the N-channel reset transistor 61 has a drain connected to a power line 70 and a source connected to a gate of the amplifier transistor 62. The power line 70 is provided with a power supply voltage VRH. The reset transistor 61 has a gate connected to a first control line 72. The first control line 72 is provided with a reset signal RES. If the reset signal RES is at a high level, the reset transistor 61 is turned on. If the reset signal RES is at a low level, the reset transistor 61 is turned off.

The N-channel amplifier transistor 62 has a drain connected to the power line 70 and a source connected to a drain of the N-channel select transistor 63.

As shown in FIG. 2, the reference capacitor Cr is provided between the gate of the amplifier transistor 62 and the first control line 72. The gate of the amplifier transistor 62 is connected to the second electrode 65 of the contact detection capacitor Cl.

As shown in FIG. 2, the select transistor 63 has a source connected to a detection line 74 and a gate connected to a second control line 76. The second control line 76 is provided with a select signal SEL. If the select signal SEL is at a high level, the select transistor 63 is turned on. If the select signal SEL is at a low level, the select transistor 63 is turned off.

Figure 3:
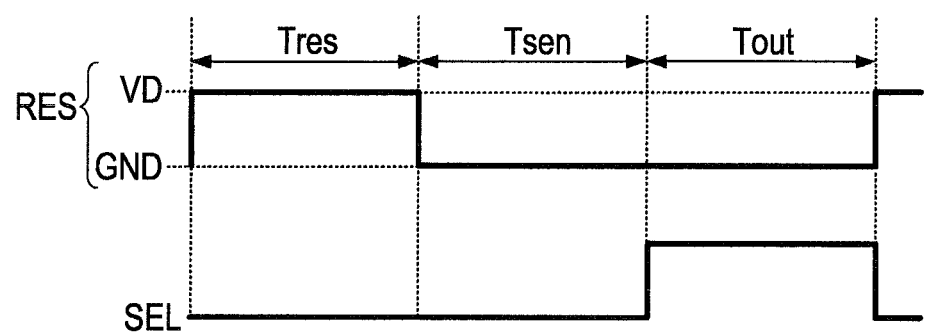
FIG. 3 is a timing chart illustrating an operation of the sensing circuit of the first embodiment.
Figure 4:
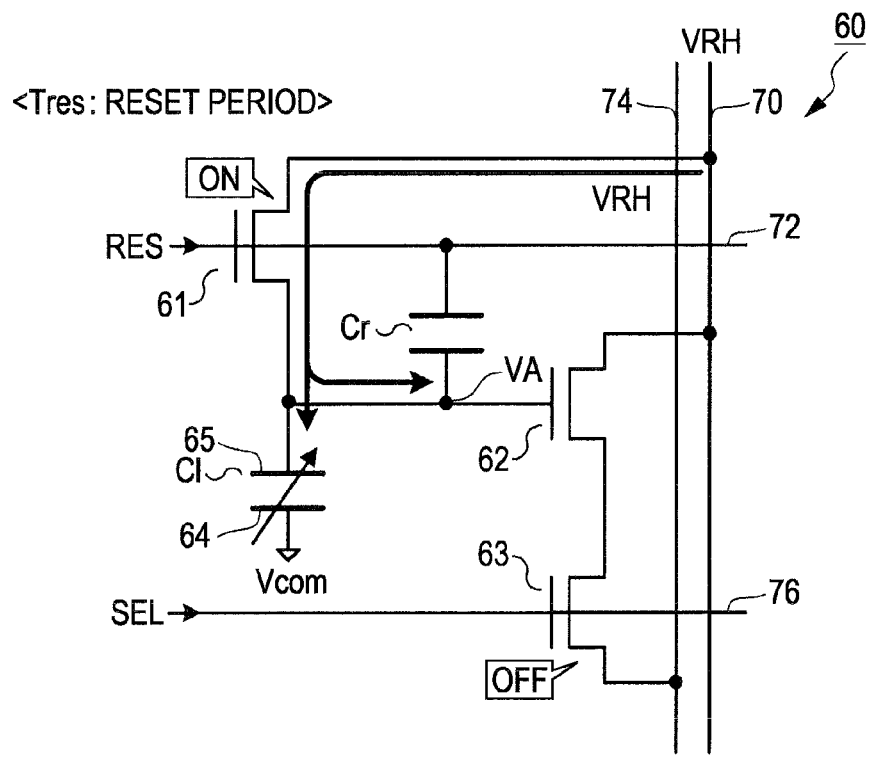
FIG. 4 illustrates the operation of the sensing circuit in a reset period.

Then, an operation of the sensing circuit 60 will be explained with reference to FIGS. 3-6. The sensing circuit 60 operates periodically while a sum of a reset period Tres, a sensing period Tsen and a read out period Tout is one period of the operation. In the reset period Tres, as shown in FIG. 3, a level of the reset signal RES provided to the first control line 72 is set to the voltage Vt. That is, in the reset period Tres, the level of the reset signal RES is set to be high and the reset transistor 61 is turned on. Meanwhile, the select signal SEL provided to the second control line 76 is maintained at a low level, and the select transistor 63 is kept off. At this moment, as shown in FIG. 4, a gate voltage VA of the amplifier transistor 62 is set to the power supply voltage VRH (reset). The second electrode 65 of the contact detection capacitor Cl is provided with the power supply voltage VRH. A voltage between the first electrode 64 and the second electrode 65 of the contact detection capacitor Cl is maintained at VRE−Vcom.

Figure 5:
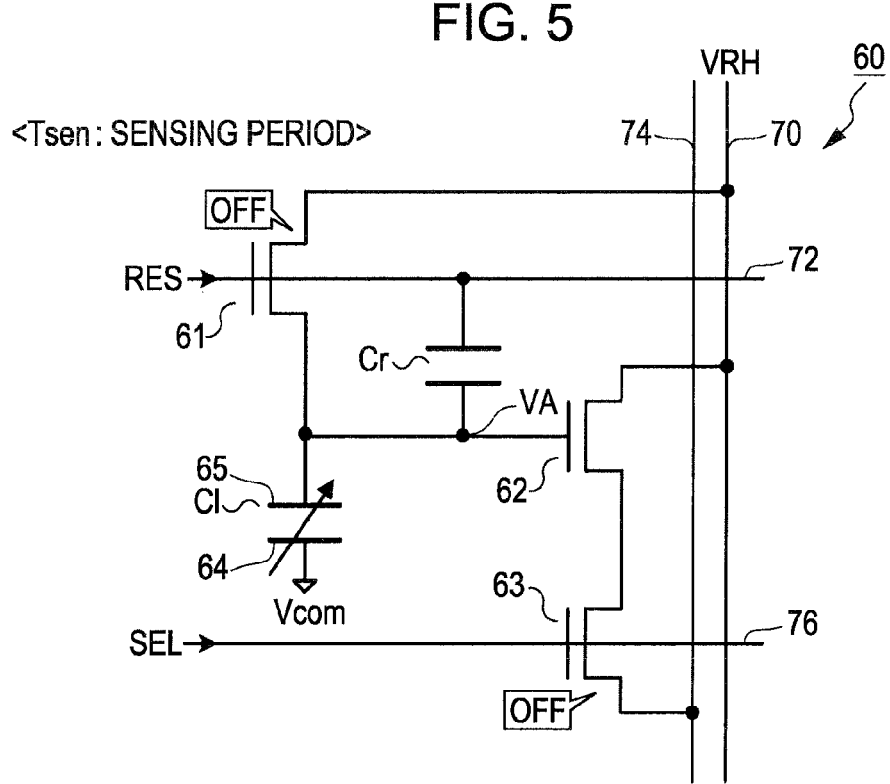
FIG. 5 illustrates the operation of the sensing circuit in a sensing period.

In the sensing period Tsen next to the reset period Tres, as shown in FIG. 3, the level of the reset signal RES changes from VD to GND (=0V). As shown in FIG. 5, the reset transistor 61 is turned off thereby. In the sensing period Tsen, the select signal SEL is maintained at the low level, and the select transistor 63 is kept off. As the impedance of the gate of the amplifier transistor 62 is sufficiently high, the gate of the amplifier transistor 62 is in an electrically floating state in the reset period Tres. As shown in FIG. 5, one of the electrodes of the reference capacitor Cr is connected to the first control line 72. Thus, if the level of the reset signal RES changes from VD to GND, the gate voltage VA of the amplifier transistor 62 changes accordingly. The change in the gate voltage VA is a value that corresponds to a capacitance ratio of the reference capacitor Cr to the contact detection capacitor Cl.

Figure 6:
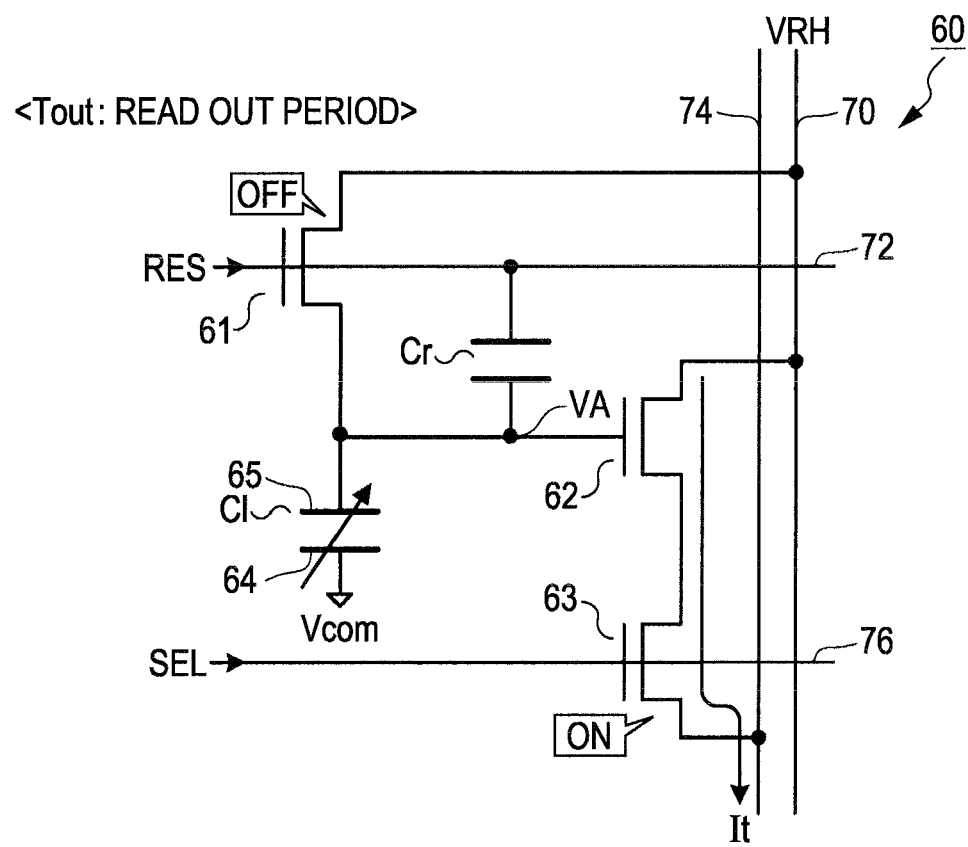
FIG. 6 illustrates the operation of the sensing circuit in a read out period.

As shown in FIG. 3, in the read out period Tout next to the sensing period Tsen, the select signal SEL changes to the high level. As shown in FIG. 6, the select transistor 63 is turned on and a detection current It of an amplitude according to the gate voltage VA of the amplifier transistor 62 thereby flows through the detection line 74. The detection current It is provided to the detection circuit 40.

If an object is in contact with the display device 10 in the sensing period Tsen, the capacitance of the contact detection capacitor Cl changes, which will be described in detail later. If the capacitance of the contact detection capacitor Cl changes, the gate voltage VA of the amplifier transistor 62 changes accordingly. Thus, a value of the detection current It provided in the sensing period Tsen while there is no contact between the object and the display device 10 is different from a value of the detection current It provided in the sensing period Tsen while the object is in contact with the display device 10.

Assume that the capacitance of the contact detection capacitor Cl while there is no contact between the object and the display device 10 is Clc, that a change of the capacitance of the contact detection capacitor Cl is ΔClc, that a capacitance of the reference capacitor Cr is Cref, and that a change of the voltage of the first control line 72 is ΔV. Then, ΔVA that is a change of the gate voltage VA upon the object touching the display device 10 is expressed by the following equation (1). In the equation (1), parasitic capacitance is neglected.

$$\Delta VA = \{(Cref \times \Delta Clc) \times \Delta V\} / \{(Cref + Clc + \Delta Clc)(Cref + Clc)\} \quad (1)$$

The detection circuit 40 detects contact between the object and the display device 10 on the basis of the value of the detection current It (corresponding to the detection signal T). As the change in the gate voltage VA while the object is in contact with the display device 10 is greater, a difference between the value of the detection current It while there is no contact and the value of It while there is contact is greater, and thus detection sensitivity becomes higher.

Figure 7:
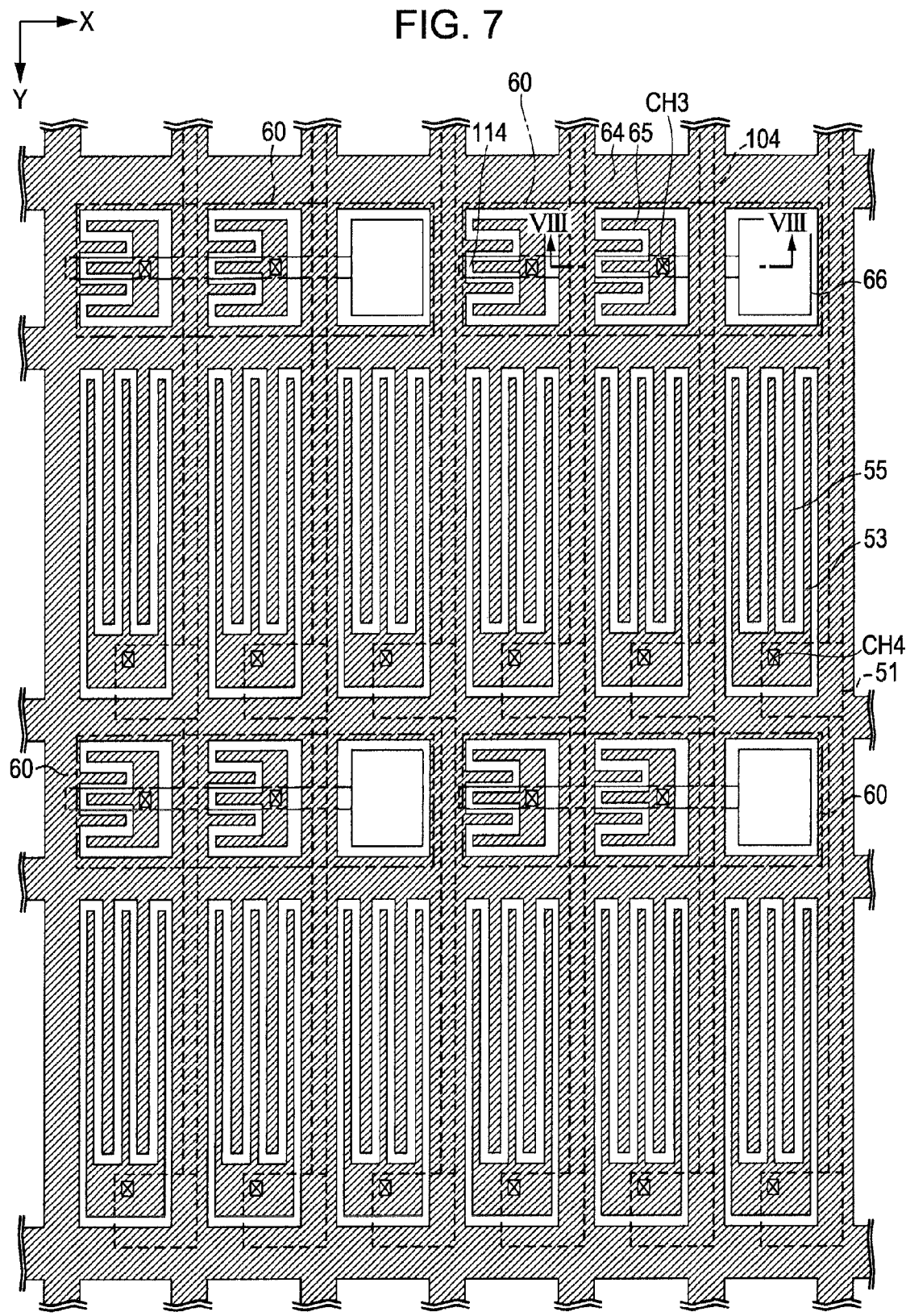
FIG. 7 is a plan view specifically showing a configuration of the display device of the first embodiment.

The sensing circuit 60 has a configuration that will be specifically explained with reference to FIGS. 7-8. FIG. 7 is a plan view specifically showing a configuration of the display device 10. As shown in FIG. 7, the sensing circuit 60 has the first electrode 64 and the second electrode 65 constituting the contact detection capacitor Cl and a circuit portion 66 including a circuit element such as the amplifier transistor 62.

Figure 8:
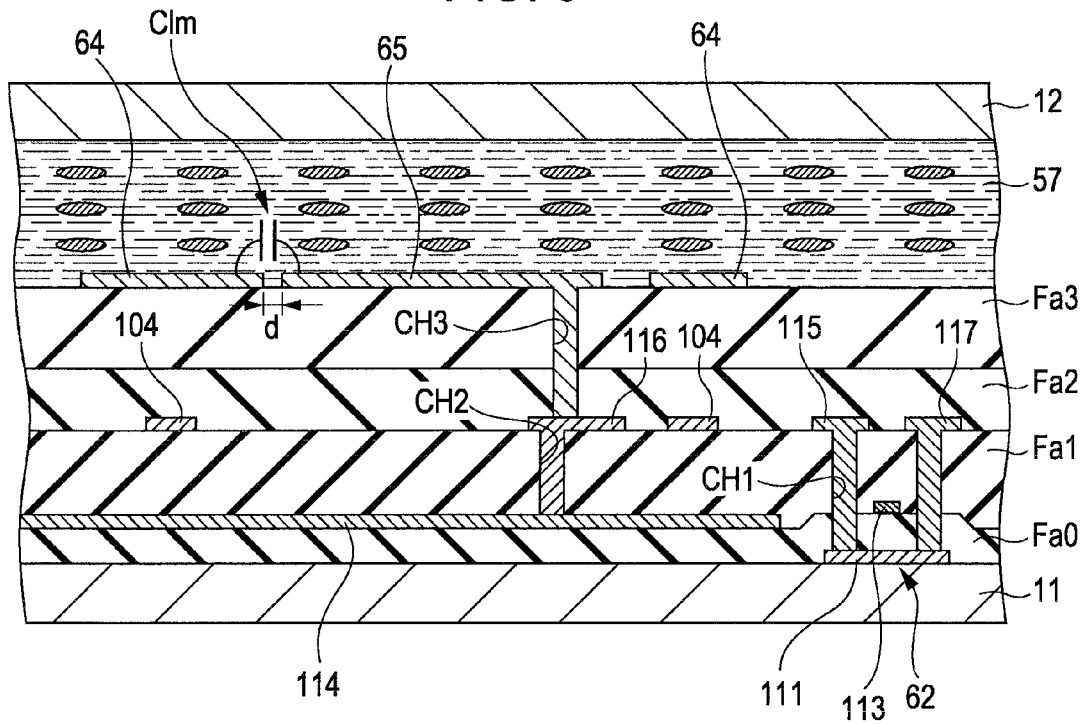
FIG. 8 is a cross-sectional view as viewed from a line "VIII-VIII" shown in FIG. 7.

FIG. 8 is a cross-sectional view of the sensing circuit 60 as viewed from a line "VIII-VIII" shown in FIG. 7. As shown in FIG. 8, the liquid crystal 57 is held between a first substrate 11 and a second substrate 12 facing each other, and the first electrode 64 and the second electrode 65 constituting the contact detection capacitor Cl are arranged between the first substrate 11 and the liquid crystal 57. That is, the first electrode 64 and the second electrode 65 are arranged on a side of a face of the first substrate 11 facing the second substrate 12. The arrangement described above will be specifically explained hereafter.

As shown in FIG. 8, the amplifier transistor 62 included in the sensing circuit 60 is formed on the face of the first substrate 11 facing the second substrate 12. The amplifier transistor 62 includes a semiconductor layer 111 formed of a semiconductor material on the face of the first substrate 11 facing the second substrate 12, and a gate electrode 113 facing the semiconductor layer 111 across a gate insulation layer Fa0 covering the semiconductor layer 111. The gate electrode 113 is covered by a first insulation layer Fa1. The amplifier transistor 62 has a drain electrode 115 and a source electrode 117 formed on a face of the first insulation layer Fa1 and electrically connected to the semiconductor layer 111 through a contact hole CH1. The drain electrode 115 and the source electrode 117 are covered by a second insulation layer Fa2.

As shown in FIG. 8, a gate wiring portion 114 electrically connected to the gate electrode 113 is formed on the gate insulation layer Fa0. The gate electrode 113 and the gate wiring portion 114 are simultaneously formed in the same process by patterning a conductive membrane (e.g., a thin membrane of aluminum) continuously formed all over the gate insulation layer Fa0. The above process for removing a common membrane member (regardless of whether single layered or plural layered) selectively so as to form plural elements simultaneously such as the gate electrode 113 and the gate wiring portion 114 will be simply called hereafter a process for forming the elements in the same layer.

As shown in FIG. 8, the gate wiring portion 114 is covered by the first insulation layer Fa1. The data line 104 and a conductive layer 116 are formed on the face of the first insulation layer Fa1. The data line 104 and the conductive layer 116 are formed on the same layer. The conductive layer 116 is electrically connected to the gate wiring portion 114 through a contact hole CH2. As shown in FIG. 8, the data line 104 and the conductive layer 116 are covered by the second insulation layer Fa2 which is further covered by a third insulation layer Fa3.

On a face of the third insulation layer Fa3, as shown in FIG. 8, a plurality of the first electrodes 64 and a plurality of the second electrodes 65 are formed. The first electrode 64 and the second electrode 65 are formed on the same layer. The first electrode 64 and the second electrode 65 are formed of a conductive material. As shown in FIG. 8, each of the second electrodes 65 is electrically connected to the conductive layer 116 through a contact hole CH3. That is, each of the second electrodes 65 is electrically connected to the gate electrode 113 of the amplifier transistor 62 through the conductive layer 116 and the gate wiring portion 114. Although not shown in detail, the third insulation layer Fa3, the first electrode 64 and the second electrode 65 are covered by an orientation membrane making the long axes of liquid crystal molecules oriented in a direction parallel to the substrate.

If a voltage (=VRH−Vcom) is applied between the first electrode 64 and the second electrode 65, an electric field is generated between the first electrode 64 and the second electrode 65 in a direction almost parallel to the substrate (horizontal direction). As shown in FIG. 8, the first electrode 64, the second electrode 65 and the liquid crystal 57 to which the electric field generated between the first electrode 64 and the second electrode 65 is applied form a plurality of capacitor elements Clm. The plurality of capacitor elements Clm form the contact detection capacitor Cl shown in FIG. 2.

Although not shown in FIG. 8, the pixel electrode 53 and the common electrode 55 constituting each of the pixel circuits P are formed on the face of the third insulation layer Fa3. The pixel electrode 53 and the common electrode 55 are formed on the same layer, and the orientation of the liquid crystal 57 is controlled by an electric field generated in a direction almost parallel to the substrate (horizontal direction) between the pixel electrode 53 and the common electrode 55. The transistor 51 of each of the pixel circuits P is formed by the same process as the amplifier transistor 62 of the sensing circuit 60. The source of the transistor 51 is electrically connected to the pixel electrode 53 through a contact hole CH4.

Figure 9:
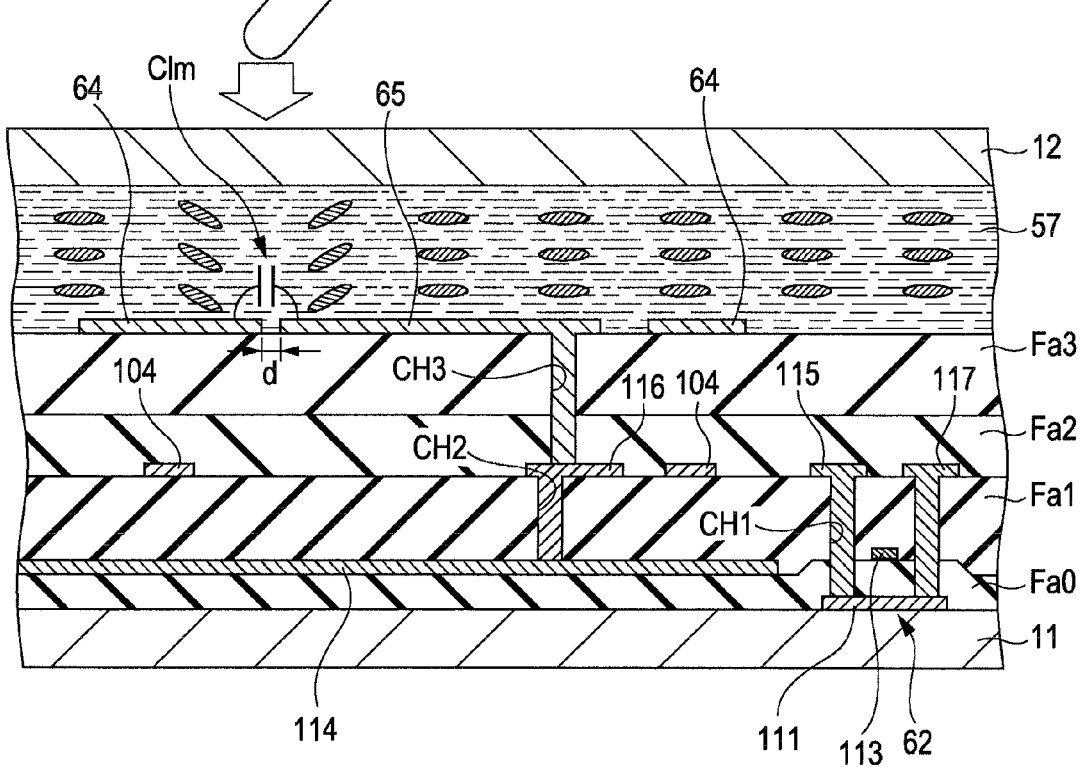
FIG. 9 illustrates a state in which an object is in contact with the display device.

A change in the capacitance of the contact detection capacitor Cl will be explained with reference to FIG. 9. Under the condition that no object is in contact with the display device 10, as shown in FIG. 8, the first substrate 11 and the second substrate 12 are parallel to each other. If an object such as a finger is in contact with the display device 10 as shown in FIG. 9, however, the second substrate 12 bends and the distance between the first substrate 11 and the second substrate 12 decreases. The orientation of the liquid crystal 57 held between the first substrate 11 and the second substrate 12 is disturbed, thereby, and the capacitance of the capacitor element Clm changes. That is, the capacitance of the contact detection capacitor Cl changes.

As understood from the above equation (1), as the change ΔClC in the capacitance resulting from going from a non-contact state to a contact state and vice versa is larger, the change ΔVA of the gate voltage VA of the amplifier transistor 62 is larger, and the detection sensitivity of the amplifier transistor 62 increases. One of parameters for increasing the change ΔClc in the capacitance resulting from going from a non-contact state to a contact state and vice versa is a distance d between the first electrode 64 and the second electrode 65. There is a value of the parameter d for maximizing the detection sensitivity of the sensing circuit 60. Incidentally, in a configuration where each of the first substrate 11 and the second substrate 12 has an electrode, the distance between the electrodes corresponds to the distance between the substrates facing each other, i.e., a cell gap value. The cell gap value is determined by a display characteristic of the display device 10, and thus changing the cell gap value at will is not permitted. Thus, the configuration where each of the first substrate 11 and the second substrate 12 has its own electrode has a problem in that it is difficult to set the distance between the electrodes in such a way as to maximize the detection sensitivity of the sensing circuit 60. That is, if the display characteristic is given priority, the detection sensitivity decreases. If the detection sensitivity is given priority, the display characteristic cannot be optimized.

Meanwhile, as the first electrode 64 and the second electrode 65 which constitute the contact detection capacitor Cl of the first embodiment are arranged between the first substrate 11 and the liquid crystal 57, the distance d between the first electrode 64 and the second electrode 65 can be set without regard to the cell gap value. Thus, an advantage of the first embodiment is that the distance d between the first electrode 64 and the second electrode 65 can be set in such a way that the detection sensitivity of the sensing circuit 60 is maximized. That is, while the cell gap value is set in such a way that the characteristic of the display device is optimized, the distance d between the first electrode 64 and the second electrode 65 can be set without regard to the cell gap value. As the liquid crystal molecules are arranged in a direction in which their longer axes are parallel to the substrate, the first embodiment has another advantage that the orientation of the liquid crystal molecules returns more rapidly after the display device 10 is pressed than in a case where the liquid crystal molecules are arranged in a direction in which their longer axes are perpendicular to the substrate.

Refer back to FIG. 7 for continuing the explanation. As shown in FIG. 7, the first electrode 64 and the second electrode 65 are shaped like the teeth of a comb each and arranged to mesh with each other. Portions of the first electrode 64 and the second electrode 65 arranged close to each other of the first embodiment can be sufficiently secured compared with a configuration in which both the first electrode 64 and the second electrode 65 are rectangular shaped and arranged separate from each other. That is, an area to which the electric field is applied is greater than that in the configuration that both the first electrode 64 and the second electrode 65 are rectangular shaped. Thus, the orientation of molecules of the liquid crystal 57 can be easily disordered so that the change ΔClc of the capacitance resulting from going from a non-contact state to a contact state and vice versa increases. The first embodiment has an advantage in that the detection sensitivity of the sensing circuit 60 can increase, thereby.

As shown in FIG. 7, the first electrode 64 of the sensing circuit 60 and the common electrode 55 of the pixel circuit P are formed on the same layer. The second electrode 65 of the sensing circuit 60 and the pixel electrode 53 of the pixel circuit P are formed on the same layer. Thus, as the sensing circuit 60 and the pixel circuit P can be manufactured simultaneously by the same manufacturing process, the first embodiment has an advantage in that the display device 10 can be easily manufactured. As shown in FIG. 7, the first electrode 64 and the common electrode 55 are formed in series, and are provided with the common voltage Vcom. As there is no need to provide the first electrode 64 and the common electrode 55 with separate voltages, the first embodiment has an advantage in that its configuration can be simplified. The first electrode 64 and the common electrode 55 are not limited to the above, and may be separately shaped not in series.

B. Second Embodiment

Figure 10:
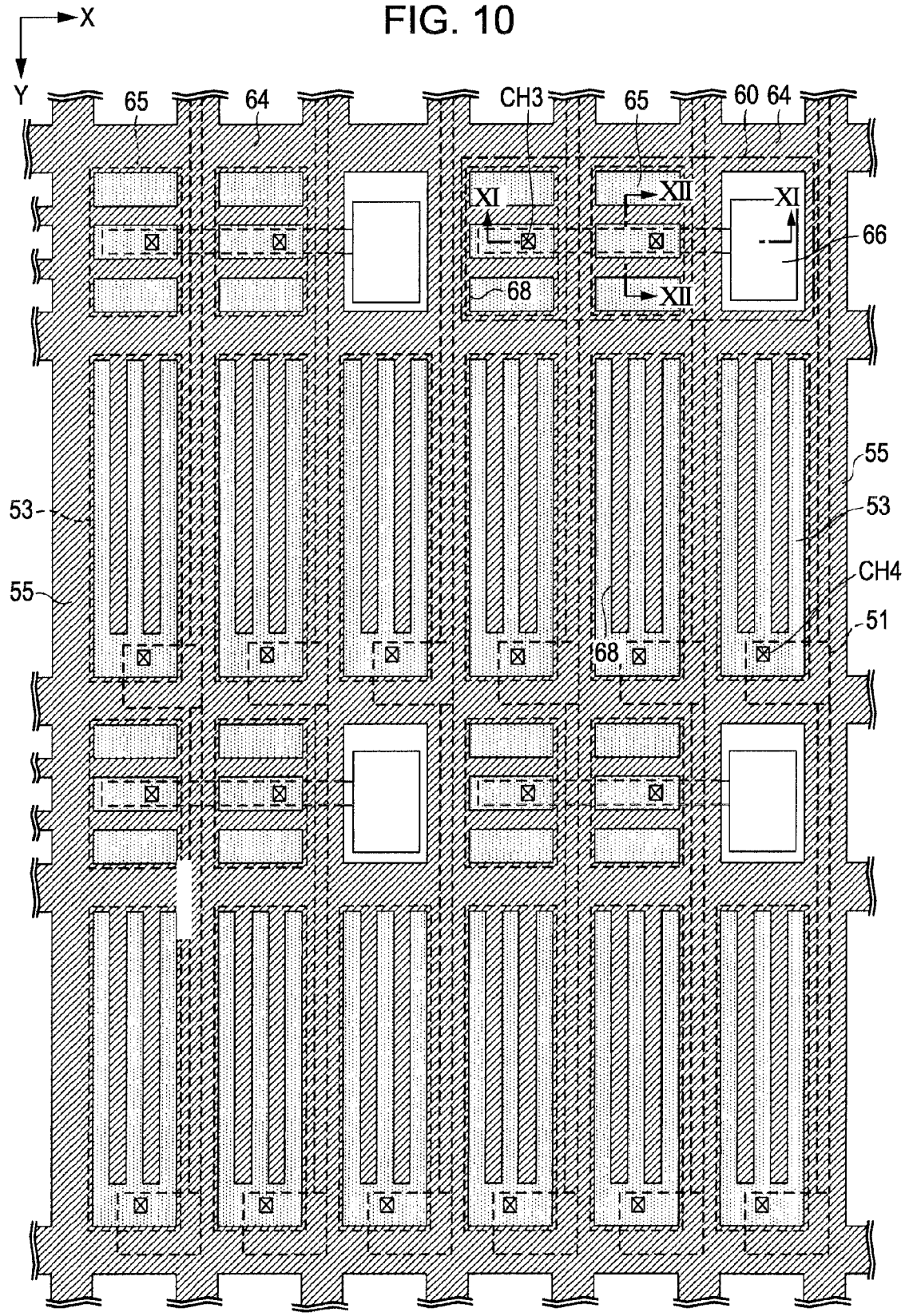
FIG. 10 is a plan view specifically showing a configuration of a display device of a second embodiment.
Figure 11:
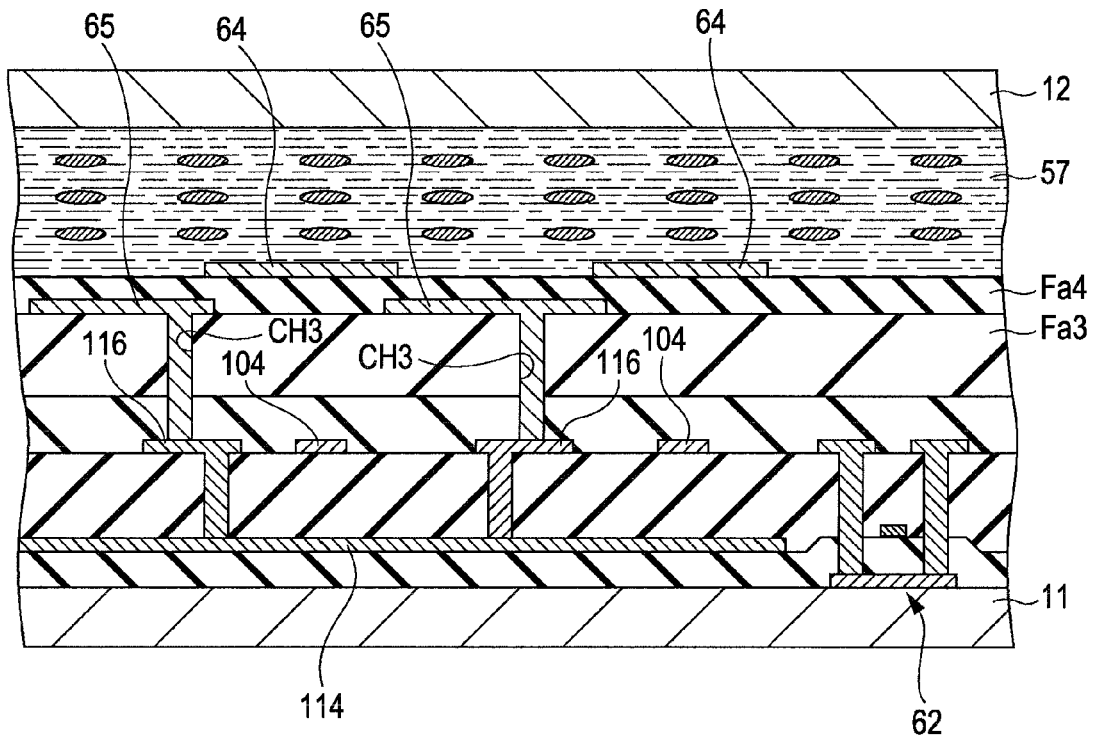
FIG. 11 is a cross-sectional view as viewed from a line "XI-XI" shown in FIG. 10.

FIG. 10 is a plan view specifically showing a configuration of the display device 10 of a second embodiment (corresponding to FIG. 7 of the first embodiment). As shown in FIG. 10, the first electrode 64 and the second electrode 65 of the sensing circuit 60 of the second embodiment are formed from different layers and arranged to face each other. FIG. 11 is a cross-sectional view of the sensing circuit 60 as viewed from a line "XI-XI" shown in FIG. 10 (corresponding to FIG. 8 of the first embodiment). As shown in FIG. 11, the second electrode 65 is arranged on the face of the third insulation layer Fa3. The second electrode 65 is electrically connected to the conductive layer 116 through the contact hole CH3 as similarly to the first embodiment. As shown in FIG. 11, the second electrode 65 is covered by a fourth insulation layer Fa4. The first electrode 64 is arranged to face the second electrode 65 on a face of the fourth insulation layer Fa4. Although not shown in detail, the fourth insulation layer Fa4 and the first electrode 64 are covered by an orientation membrane making long axes of the liquid crystal molecules oriented in a direction parallel to the substrate.

Figure 12:
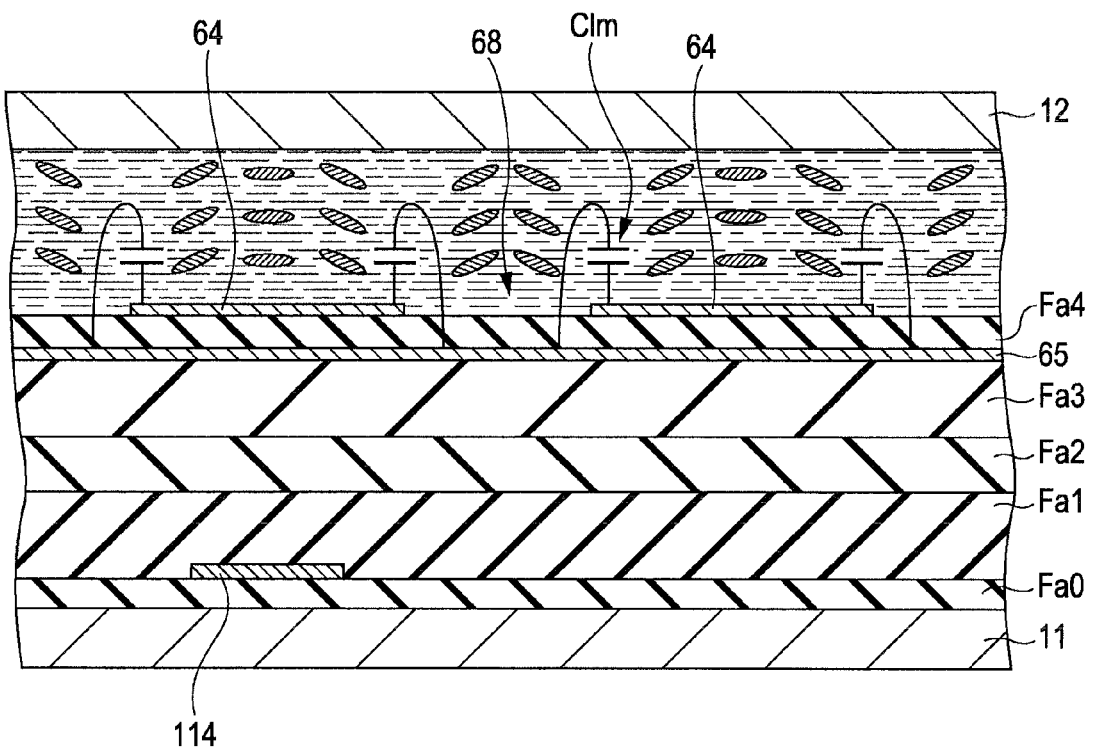
FIG. 12 is a cross-sectional view as viewed from a line "XII-XII" shown in FIG. 10.

As shown in FIG. 10, a slit 68 is formed in the first electrode 64 for passing an electric field generated between the first electrode 64 and the second electrode 65. FIG. 12 is a cross-sectional view as viewed from a XII-XII line shown in FIG. 10. As shown in FIG. 12, the first electrode 64, the second electrode 65 and the liquid crystal 57 to which the electric field generated between the first electrode 64 and the second electrode 65 is applied form a plurality of the capacitor elements Clm. The plural capacitor elements Clm form the contact detection capacitor Cl of the sensing circuit 60.

As the first electrode 64 and the second electrode 65 are formed from the different layers and arranged to face each other, the electric field emitted from the second electrode 65 to the first electrode 64 through the slit 68 or vice versa includes components being perpendicular to the substrate more than in the configuration in which the first electrode 64 and the second electrode 65 are formed from the same layer such as the first embodiment. Thus, the liquid crystal molecules of the second embodiment lean more due to the electric field generated between the first electrode 64 and the second electrode 65 than in the configuration of the first embodiment. If the liquid crystal molecules are pressed while leaning, the orientation of the liquid crystal molecules can change more easily than in the case where the liquid crystal molecules are pressed while being parallel to the substrate. Thus, the change ΔClc of the capacitance resulting from going from a non-contact state to a contact state and vice versa of the second embodiment is greater than that of the first embodiment. The second embodiment has an advantage in that the detection sensitivity of the sensing circuit 60 can increase.

As shown in FIG. 10, the first electrode 64 of the sensing circuit 60 and the common electrode 55 of the pixel circuit P are formed on the same layer. The second electrode 65 of the sensing circuit 60 and the pixel electrode 53 of the pixel circuit P are formed on the same layer. Thus, as the sensing circuit 60 and the pixel circuit P can be simultaneously manufactured by the same process, the second embodiment has an advantage in that the display device 10 can be easily manufactured.

C. Third Embodiment

Figure 13:
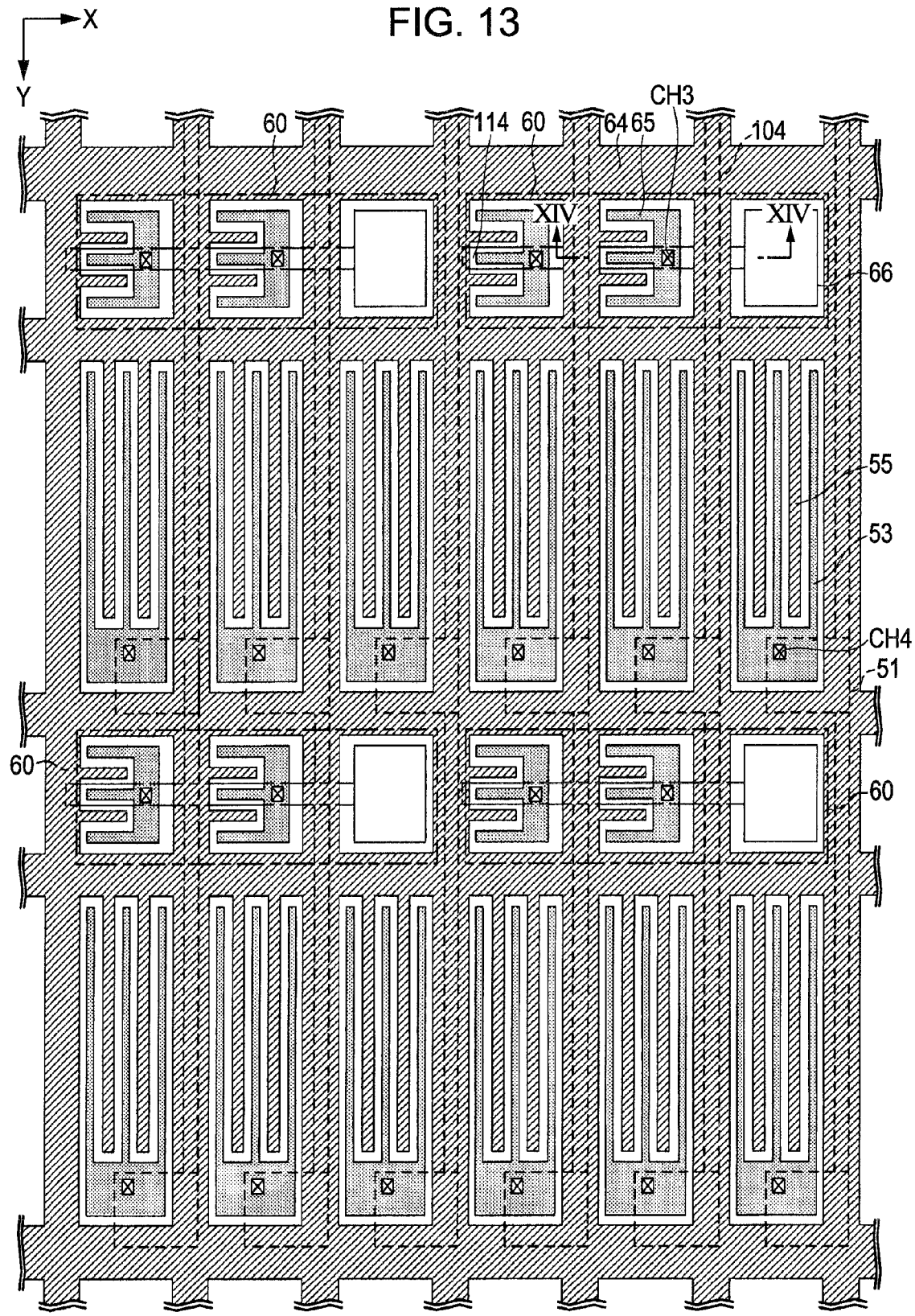
FIG. 13 is a plan view specifically showing a configuration of a display device of a third embodiment.

FIG. 13 is a plan view specifically showing a configuration of the display device 10 of a third embodiment (corresponding to FIG. 7 and FIG. 10). As shown in FIG. 13, the sensing circuit 60 of the third embodiment is configured differently from that of the second embodiment in that the first electrode 64 and the second electrode 65 are formed from different layers and that the first electrode 64 and the second electrode 65 are shaped like the teeth of a comb each and arranged to mesh with each other on the plan view. Each of other portions is a same as the corresponding one of the second embodiment, and its explanation is omitted.

Figure 14:
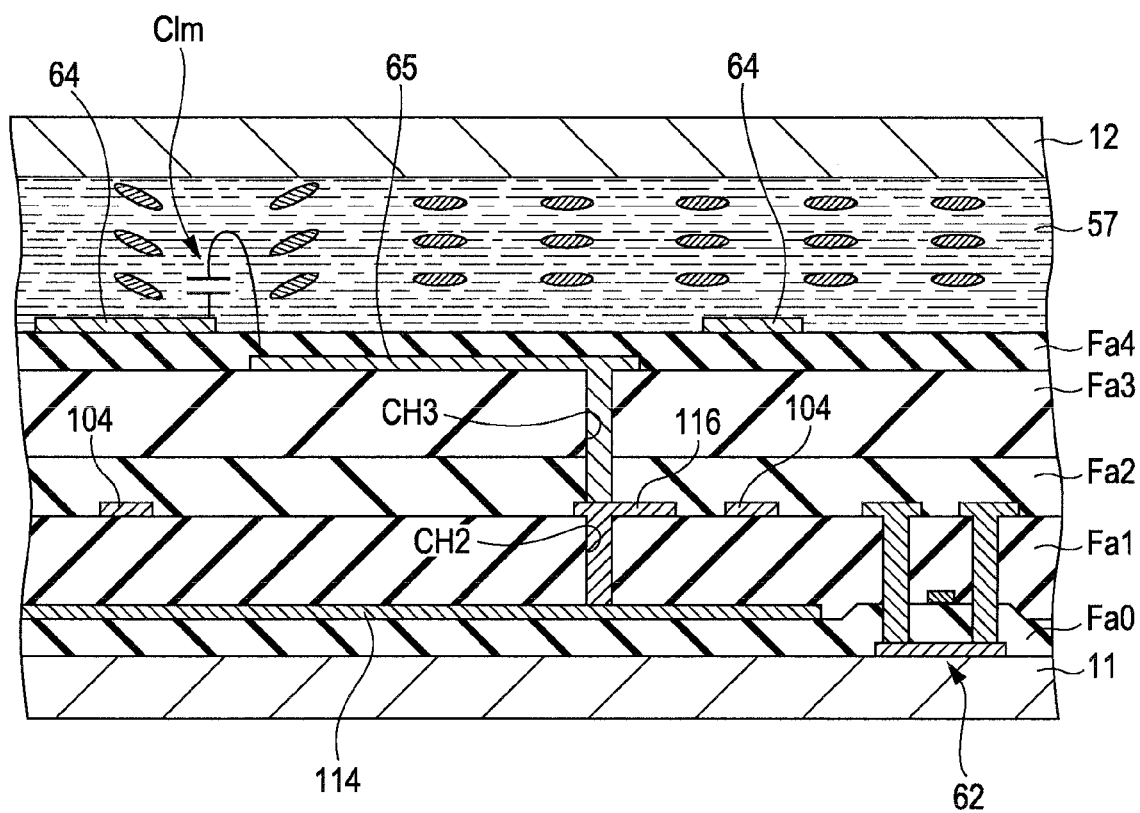
FIG. 14 is a cross-sectional view as viewed from a line "XIV-XIV" shown in FIG. 13.

FIG. 14 is a cross-sectional view of the of the sensing circuit 60 as viewed from a line "XIV-XIV" shown in FIG. 13 (corresponding to FIG. 8 and FIG. 11 of the first embodiment). The first electrode 64 of the third embodiment is shaped in such a way that an area of a portion overlapping the second electrode 65 is smaller than an area of a portion other than the portion overlapping the second electrode 65, so that an area of the electrode forming the capacitor element Clm can be made smaller than that of the second embodiment. Thus, the capacitance of the capacitor element Clm can be made smaller than that of the second embodiment. As understood from the above equation (1), as the capacitance Clc of the contact detection capacitor Cl is smaller, the change ΔVA of the of the gate voltage VA resulting from going from a non-contact state to a contact state and vice versa is greater, and the detection sensitivity of the amplifier transistor 62 increases. The third embodiment has an advantage in that the detection sensitivity of the sensing circuit 60 increases, thereby.

As shown in FIG. 13, the first electrode 64 and the second electrode 65 of the third embodiment are shaped like the teeth of a comb each and arranged to mesh with each other, the area to which the electric field is applied is greater than that of the configuration where both the first electrode 64 and the second electrode 65 are shaped rectangular, as similarly to the first embodiment. Thus, the orientation of the liquid crystal 57 can be easily disordered so that the change ΔClc of the capacitance resulting from going from a non-contact state to a contact state and vice versa increases. The third embodiment has an advantage in that the detection sensitivity of the sensing circuit 60 can increase, thereby.

Still, as shown in FIG. 13, the first electrode 64 and the second electrode 65 of the sensing circuit 60 of the third embodiment are formed on the same layer. And the second electrode 65 of the sensing circuit 60 and the pixel electrode 53 of the pixel circuit P are formed on the same layer. Thus, as the sensing circuit 60 and the pixel circuit P can be manufactured simultaneously by the same manufacturing process, the third embodiment has an advantage in that the display device 10 can be easily manufactured.

D. Modifications

The invention is not limited to the above embodiments, and can be modified, e.g., as follows, and two or more following modifications can be combined.

(1) First Modification

The above embodiments give examples in which the sensing circuit 60 of the invention is used for the display device 10. The sensing circuit 60 is not limited to the above, and can be used for detecting contact with an object in any form. As the first electrode 64 and the second electrode 65 of the sensing circuit 60 constituting the contact detection capacitor Cl are arranged on a side of the face of the first substrate 11 facing the second substrate 12, the distance between the first electrode 64 and the second electrode 65 can keep a constant value differently from a configuration in which an electrode is arranged in each of the first substrate 11 and the second substrate 12 facing each other. Thus, as the distance between the first electrode 64 and the second electrode 65 can be precisely set to a desired value, the sensing circuit 60 of the invention has an advantage in that the capacitance of the contact detection capacitor Cl can be set to a target value. That is, variation of sensitivity of sensing can be suppressed.

(2) Second Modification

The above first and third embodiments give examples in which the first electrode 64 and the second electrode 65 are shaped like the teeth of a comb each, and arranged to mesh with each other. Another arrangement may be adopted in which the first electrode 64 and the second electrode 65 are shaped like the teeth of a comb and rectangular, respectively, and are arranged to mesh with each other. In short, it is enough that at least one of the first electrode 64 and the second electrode 65 is shaped like the teeth of a comb and both of them are arranged to mesh with each other. Both of the first electrode 64 and the second electrode 65 may be shaped rectangular.

(3) Third Modification

The above third embodiment gives an examples in which the first electrode 64 and the second electrode 65 are shaped like the teeth of a comb and arranged to mesh with each other on the plan view, and has no portion overlapping each other. Another arrangement may be adopted in which the first electrode 64 and the second electrode 65 have portions overlapping each other. In short, it is enough that an area of the portion of the first electrode 64 overlapping the second electrode 65 is smaller than an area of the portion of the first electrode 64 other than the portion overlapping the second electrode 65. Still another arrangement may be adopted in which an area of the portion of the second electrode 65 overlapping the first electrode 64 is smaller than an area of the portion other than the portion overlapping the first electrode 64. As the areas of the electrodes can be reduced, thereby, the capacitance of the capacitor element can be reduced. As understood from the above equation (1), as the change ΔVA of the gate voltage VA resulting from going from a non-contact state to a contact state and vice versa increases, the detection sensitivity of the sensing circuit 60 increases.

(4) Fourth Modification

Although the above embodiments give examples in which each of the groups C has the sensing circuit 60, the arrangement and the number of the sensing circuit 60 are optional. The sensing circuit 60 may be arranged, e.g., for a plurality of the groups C, or for each of the pixel circuits P.

(5) Fifth Modification

The kind of the dielectric material held between the first substrate 11 and the second substrate 12 of the sensing circuit 60 of the invention is optional. As described with respect to the above embodiments, e.g., electro-optical material having an optical characteristic that changes in response to applied electric energy such as liquid crystal may be held between the first substrate 11 and the second substrate 12. Instead of the liquid crystal, an organic light emitting diode element, an inorganic light emitting diode or LED (light emitting diode) may be adopted.

The invention can be applied to an electrophoretic display (EPD) including an electrophoretic layer (e.g., a collection of lots of microcapsules filled with a dispersing medium) having charged white or black minute particles in the dispersing medium as the dielectric material instead of the liquid crystal.

E. Applications

Figure 15:
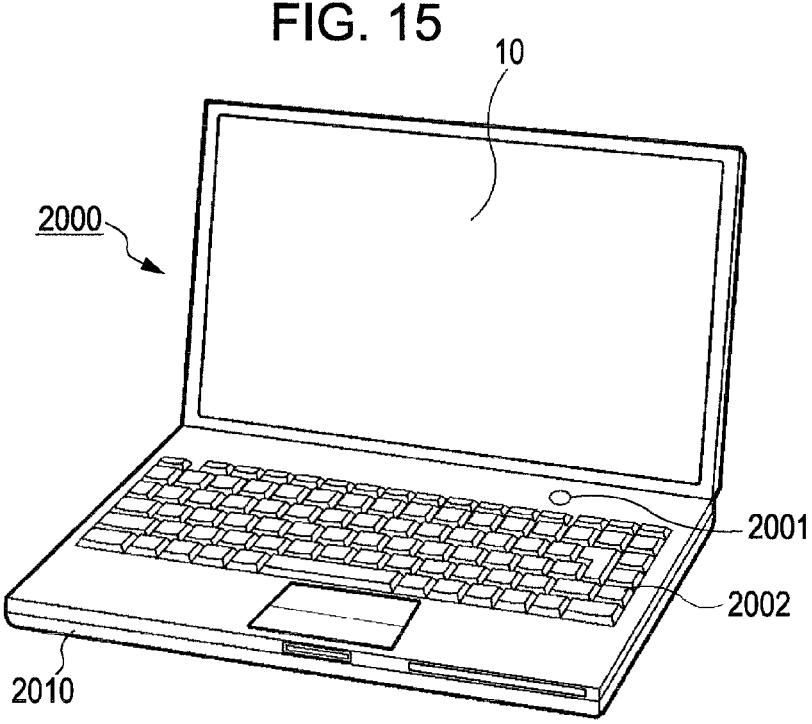

Next, an electronic apparatus utilizing the display device 10 of the invention will be explained. FIG. 15 is a perspective view of a mobile personal computer 2000 including the display device 10 of one of the embodiments described above. The mobile personal computer 2000 has the display device 10 and a main body 2010. The main body 2010 has a power switch 2001 and a keyboard 2002.

Figure 16:
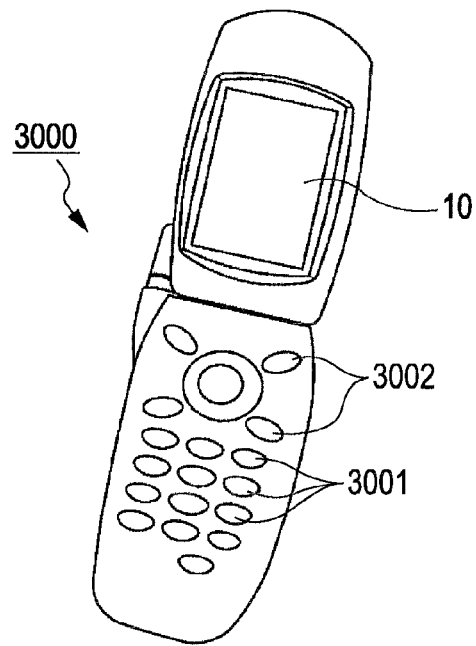

FIG. 16 shows a configuration of a mobile phone 3000 to which the display device 10 of one of the embodiments is applied. The mobile phone 3000 has a plurality of operation buttons 3001, a scroll button 3002 and the display device 10. If the scroll button 3002 is operated, a displayed screen scrolls on the display device 10.

Figure 17:
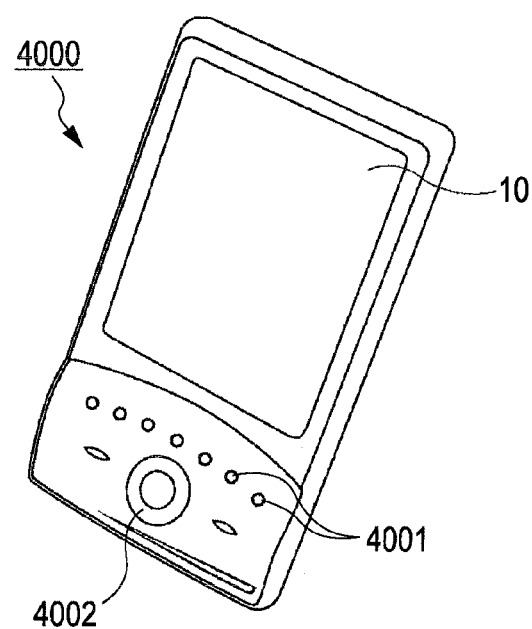

FIG. 17 shows a configuration of a personal digital assistant (PDA) 4000 to which the display device 10 of one of the embodiments is applied. The PDA 4000 has a plurality of operation buttons 4001, a power switch 4002 and the display device 10. If the power switch 4002 is operated, various kinds of information such as a directory or a schedule list are displayed on the display device 10.

The display device of the invention can be applied to electronic apparatuses other than those shown in FIGS. 15-17, such as a digital still camera, a television, a video camera, a car navigation system, a pager, a digital pocketbook, an electronic paper, a calculator, a word processor, a workstation, a TV phone, a POS terminal, a printer, a scanner, a photocopier, a video player, an apparatus having a touch panel and so on. Use of the display device of the invention is not limited to a display of an image. The display device of the invention can be applied, e.g., to a write head of an image forming device such as an optically addressed printer or an electronic photocopier for exposing a photosensitive material in accordance with an image to be formed on a record material such as a paper.

What is claimed is:

1. A sensing circuit, comprising:
   a first substrate;
   a second substrate facing the first substrate;
   a layer of dielectric material held between the first substrate and the second substrate;
   a pixel including a first electrode and a second electrode, the first electrode being disposed between the dielectric material and the first substrate, the second electrode being disposed between the dielectric material and the first substrate,
      wherein the first electrode is a common electrode of a pixel circuit and the second electrode is a pixel electrode of the pixel circuit;
   a first sensing electrode, wherein the first sensing electrode and the common electrode of the pixel circuit are formed in a same first layer;
   a second sensing electrode, wherein the second sensing electrode and the pixel electrode of the pixel circuit are formed in a same second layer; and
   an electrostatic capacitance detection unit configured to produce a detection signal having an amplitude based on a capacitance formed between the first sensing electrode and the second sensing electrode through the dielectric material.

2. The sensing circuit of claim 1,
   the first sensing electrode and the second electrode being formed on a same layer,
   the first sensing electrode having at least two projections extending in one direction, and
   the second sensing electrode having a projection extending toward a portion between the two projections of the first sensing electrode.

3. The sensing circuit of claim 1,
   the first sensing electrode and the second sensing electrode being formed from different layers and arranged so as to face each other,
   the first sensing electrode being arranged between the dielectric material and the second sensing electrode, and
   a slit being formed in the first sensing electrode for passing an electric field generated between the first sensing electrode and the second sensing electrode.

4. The sensing circuit of claim 1,
   the first sensing electrode and the second sensing electrode being formed from different layers,
   the first sensing electrode being arranged between the dielectric material and the second sensing electrode,
   at least one of the first sensing electrode and the second sensing electrode having at least two projections extending in one direction, and
   an area of a portion of the first electrode overlapping the second sensing electrode being smaller than an area of a portion of the first sensing electrode other than the portion overlapping the second sensing electrode.

5. A display device including the sensing circuit of claim 1, further comprising:
   a third electrode and a fourth electrode, the first sensing electrode and the third electrode being formed on a same layer, the second sensing electrode and the fourth electrode being formed on another same layer, and
   a pixel circuit including the dielectric material that an electric field generated between the third electrode and the fourth electrode is applied to, the dielectric material being a substance having dielectric anisotropy.

6. A display device including the sensing circuit of claim 3, further comprising:
   a third electrode and a fourth electrode, the first sensing electrode and the third electrode being formed on a same layer, the second sensing electrode and the fourth electrode being formed on another same layer, and
   a pixel circuit including the dielectric material that an electric field generated between the third electrode and the fourth electrode is applied to, the dielectric material being a substance having dielectric anisotropy.

7. A display device including the sensing circuit of claim 4, further comprising:
   a third electrode and a fourth electrode, the first sensing electrode and the third electrode being formed on a same layer, the second sensing electrode and the fourth electrode being formed on another same layer, and
   a pixel circuit including the dielectric material that an electric field generated between the third electrode and the fourth electrode is applied to, the dielectric material being a substance having dielectric anisotropy.

8. The display device of claim 5, the dielectric material being a substance having dielectric anisotropy and optical anisotropy.

9. An electronic apparatus including the display device of claim 5.

10. The sensing circuit of claim 1, further comprising:
    an orientation membrane covering at least the first electrode and the second electrode, and the dielectric material being composed of liquid crystal molecules having long axes, the orientation membrane orienting the long axes in a direction parallel to the first substrate.

11. A sensing circuit, comprising:
a first substrate;
a second substrate;
a layer of dielectric material between the first substrate and the second substrate;
a pixel including a first electrode and a second electrode, the first electrode being disposed between the dielectric material and the first substrate, the second electrode being disposed between the dielectric material and the first substrate,
wherein the first electrode is a common electrode of a pixel circuit and the second electrode is a pixel electrode of the pixel circuit;
a first sensing electrode, wherein the first sensing electrode and the common electrode of the pixel circuit are formed in a same first layer and a second sensing electrode, wherein the second sensing electrode and the pixel electrode of the pixel circuit are formed in a same second layer, and
wherein a distance between the first sensing electrode and the second sensing electrode is kept constant such that a capacitance formed between the first sensing electrode and the second sensing electrode through the dielectric material corresponds to a target value that maximizes a detection sensitivity of the circuit.

12. The sensing circuit of claim 11, the distance between the first sensing electrode and the second sensing electrode being independent of a distance between the first substrate and the second substrate.

13. The sensing circuit of claim 11, the first sensing electrode and the second sensing electrode being formed on a same layer.

14. The sensing circuit of claim 11, the first sensing electrode and the second sensing electrode being formed on different layers.

15. A display device including the sensing circuit of claim 11, further comprising:
a third electrode and a fourth electrode, the first sensing electrode and the third electrode being formed on a same layer, the second sensing electrode and the fourth electrode being formed on another same layer, and
a pixel circuit including the dielectric material that an electric field generated between the third electrode and the fourth electrode is applied to, the dielectric material being a substance having dielectric anisotropy.

16. The sensing circuit of claim 11, further comprising:
an orientation membrane covering at least the first sensing electrode and the second sensing electrode, and
the dielectric material being composed of liquid crystal molecules having long axes, the orientation membrane orienting the long axes in a direction parallel to the first substrate.

17. The display device of claim 15, the dielectric material being a substance having dielectric anisotropy and optical anisotropy.

18. An electronic apparatus including the display device of claim 15.

19. A sensing circuit, comprising:
a first substrate;
a second substrate facing the first substrate;
a layer of dielectric material held between the first substrate and the second substrate;
a first electrode disposed between the dielectric material and the first substrate;
a second electrode disposed between the dielectric material and the first substrate,
wherein the first electrode is a common electrode of a pixel circuit and the second electrode is a pixel electrode of the pixel circuit;
a first sensing electrode, wherein the first sensing electrode and the common electrode of the pixel circuit are formed in a same first layer;
a second sensing electrode, wherein the second sensing electrode and the pixel electrode of the pixel circuit are formed in a same second layer; and
an electrostatic capacitance detection unit configured to produce a detection signal having an amplitude based upon a capacitance formed between the first sensing electrode and the second sensing electrode through the dielectric material.

20. A sensing circuit, comprising:
a first substrate;
a second substrate facing the first substrate;
a layer of dielectric material held between the first substrate and the second substrate;
a first electrode disposed between the dielectric material and the first substrate;
a second electrode disposed between the dielectric material and the first substrate,
wherein the first electrode is a common electrode of a pixel circuit and the second electrode is a pixel electrode of the pixel circuit;
a first sensing electrode, wherein the first sensing electrode and the common electrode of the pixel circuit are formed in a same first layer;
a second sensing electrode, wherein the second sensing electrode and the pixel electrode of the pixel circuit are formed in a same second layer; and
an electrostatic capacitance detection unit configured to produce a detection signal having an amplitude based on a capacitance formed between the first sensing electrode and the second sensing electrode through the dielectric material.

* * * * *